(12) United States Patent
Hara

(10) Patent No.: US 7,198,280 B2
(45) Date of Patent: Apr. 3, 2007

(54) VEHICLE

(75) Inventor: Nobuo Hara, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/538,987

(22) PCT Filed: Aug. 5, 2004

(86) PCT No.: PCT/JP2004/011249

§ 371 (c)(1),
(2), (4) Date: Apr. 17, 2006

(87) PCT Pub. No.: WO2005/014128

PCT Pub. Date: Feb. 17, 2005

(65) Prior Publication Data

US 2006/0213711 A1    Sep. 28, 2006

(30) Foreign Application Priority Data

Aug. 7, 2003    (JP) ............................. 2003-288968

(51) Int. Cl.
*G10H 7/00* (2006.01)
(52) U.S. Cl. .................. 280/87.042; 280/87.041; 280/87.021; 280/87.01; 280/29
(58) Field of Classification Search .......... 280/87.042, 280/87.041, 87.021, 87.01, 29
See application file for complete search history.

(56) References Cited

U.S. PATENT DOCUMENTS 5,487,441 A * 1/1996 Endo et al. ................. 180/181
6,050,357 A * 4/2000 Staelin et al. ............... 180/65.1
7,023,330 B2 * 4/2006 Kamen et al. ............... 340/427
7,053,288 B2 * 5/2006 Iwai et al. ..................... 84/600
7,053,289 B2 * 5/2006 Iwai et al. ..................... 84/600

(Continued)

FOREIGN PATENT DOCUMENTS

CA    2 350 437 A1    5/2000

(Continued)

OTHER PUBLICATIONS

International Search Report issued in the corresponding International Application No. PCT/JP2004/011249, mailed on May 18, 2006.

(Continued)

*Primary Examiner*—J. Allen Shriver
*Assistant Examiner*—Cynthia F. Collado
(74) *Attorney, Agent, or Firm*—Keating & Bennett, LLP

(57) ABSTRACT

An electric skateboard is capable of detecting a load applied from a rider accurately without influence from various positions of the rider on the board and without influence from various road conditions. The electric skateboard includes a board arranged to receive a load from the rider, a load detection sensor arranged to detect the load received by the board, a front wheel provided on a lower surface of the board, an arm which rotatably supports the front wheel, a first frame connected with the arm, a second frame fixed to the board, and a shaft connecting the first and second frames. The load detection sensor is sandwiched by the first and second frames. A rear wheel is provided on the lower surface of the board and has a construction that is similar to that of the front wheel.

20 Claims, 11 Drawing Sheets

U.S. PATENT DOCUMENTS 7,090,040 B2 * 8/2006 Kamen et al. ................ 180/7.1
7,138,774 B2 * 11/2006 Negoro et al. .............. 318/139

FOREIGN PATENT DOCUMENTS

| JP | 10-023613 | 1/1998 |
| JP | 3052773 U | 7/1998 |
| JP | 10-211313 | 8/1998 |
| JP | 10-314366 | 12/1998 |
| JP | 2000-140190 | 5/2000 |
| JP | 2001-259108 | 9/2001 |
| JP | 2002-529167 A | 9/2002 |
| JP | 2003-237670 | 8/2003 |
| JP | 2004-024614 | 1/2004 |

OTHER PUBLICATIONS

Official Communication issued in corresponding Chinese Patent Application No. 2004800038111, dated Oct. 27, 2006.
Application No. 10/539,240, Filed Dec. 14, 2005, 2005. "Skate board.".

* cited by examiner

F I G. 6
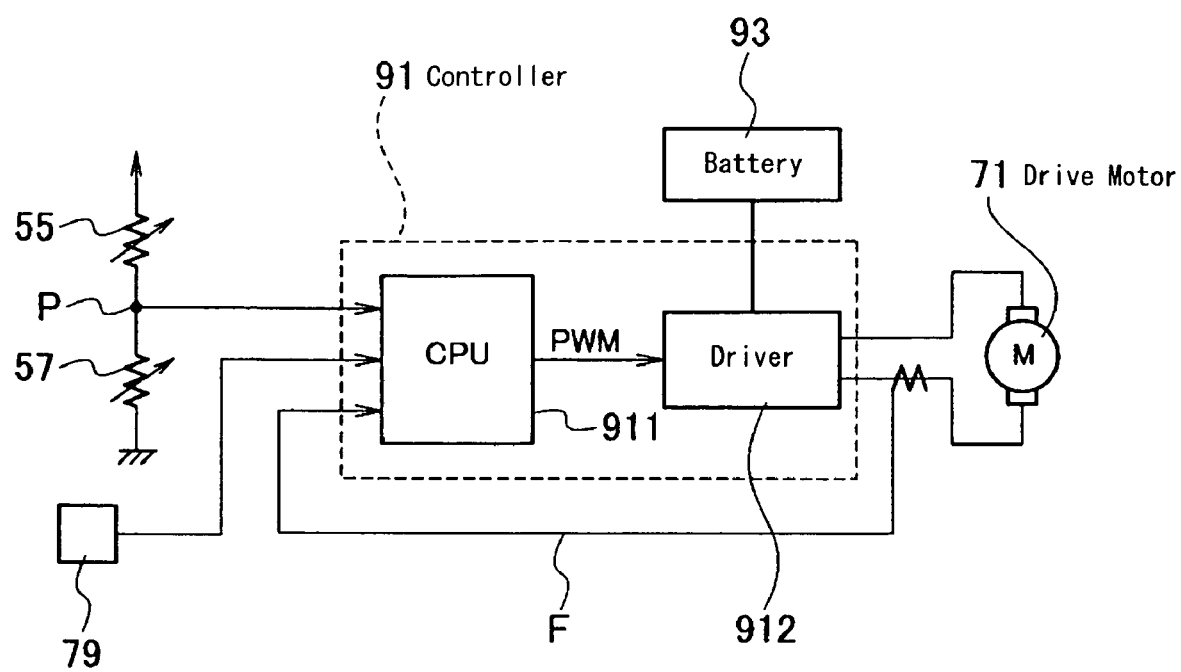

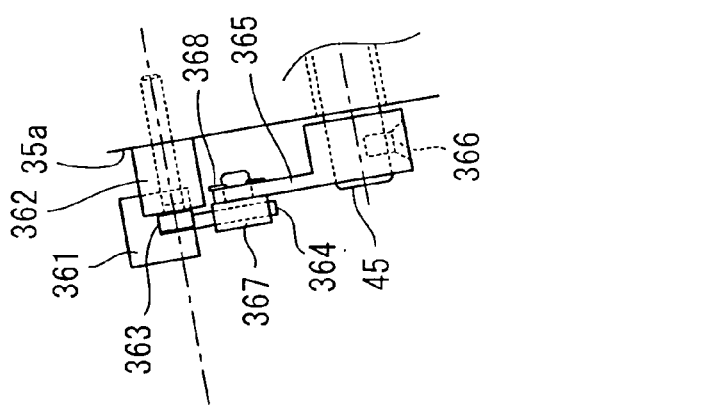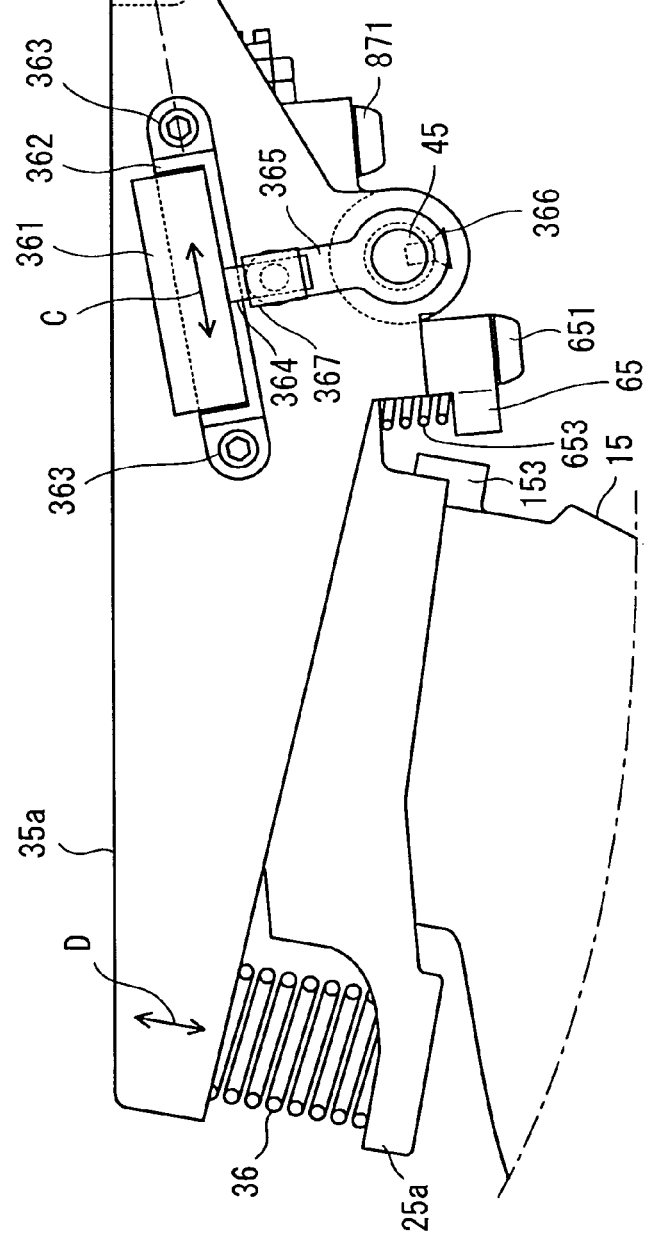
FIG. 9B
FIG. 9A

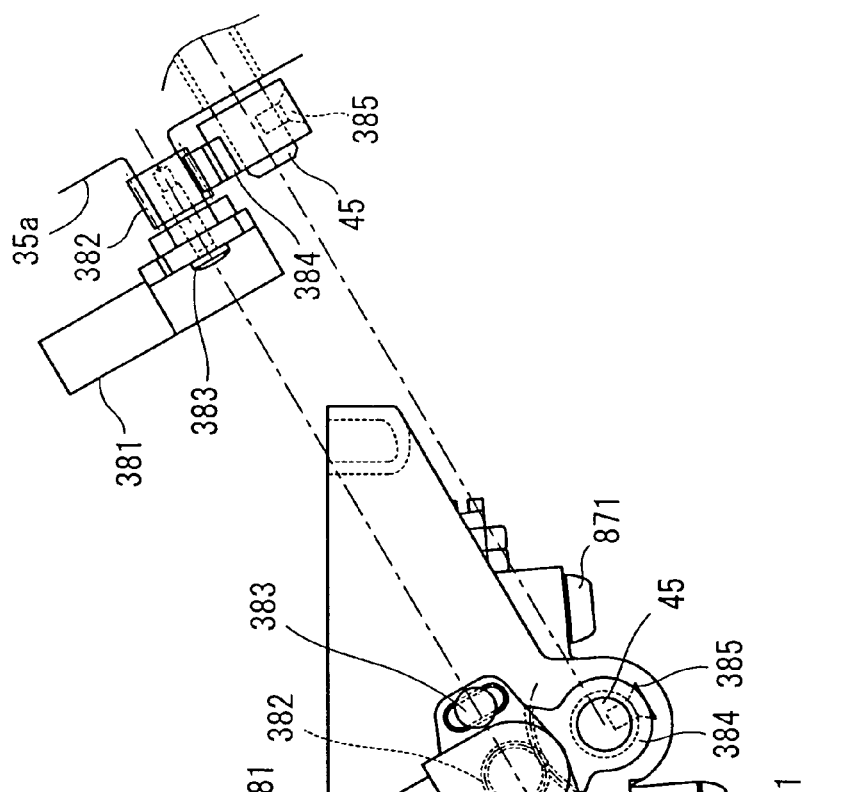
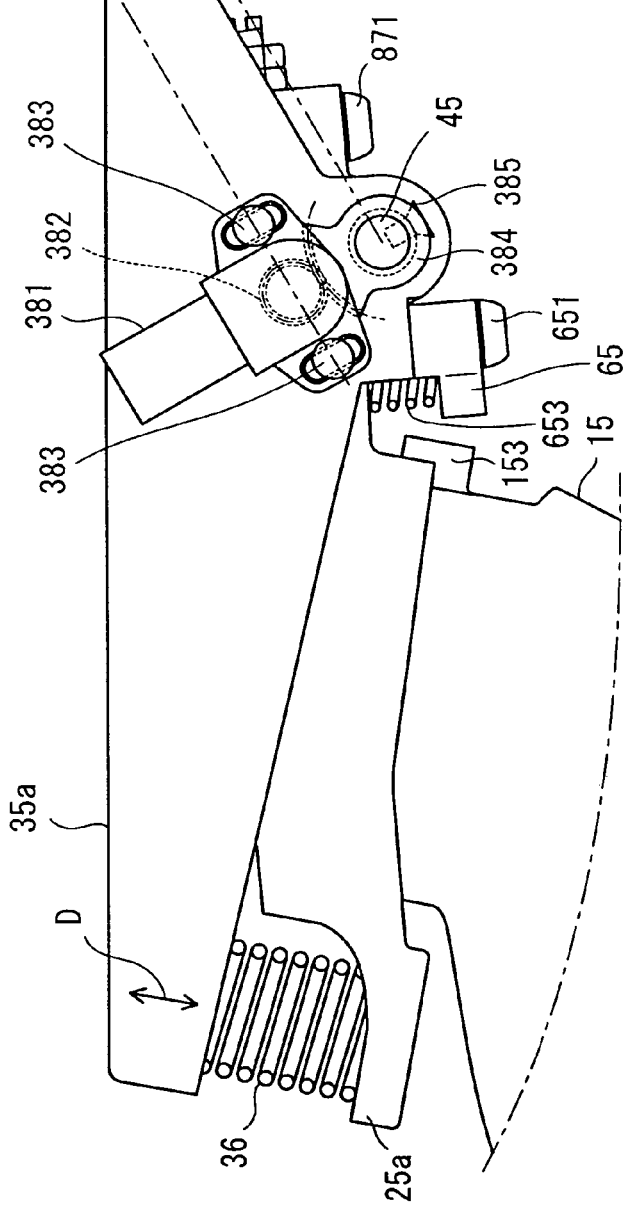
FIG.10 A
FIG.10 B

VEHICLE

BACKGROUND OF THE INVENTION

1. Field of the Invention

The present invention relates to a vehicle, and more specifically, the present invention relates to a vehicle such as an electric skateboard which detects a load applied from the rider.

2. Description of the Related Art

Conventionally, electric skateboards, electric wheelchairs, electric carts and so on are known as motor-driven small electric vehicles. These electric vehicles detect a load applied to the vehicle and generate a propelling force based on the load. The vehicles are operated by manually controlling a throttle, a joystick and so on thereby performing operation such as speed and acceleration control, forward/reverse shift, turning signals and steering, etc. (See Patent Document 1, for example).

Also, there have been proposals to provide the board with pressure sensors and strain sensors for controlling driving directions and speed (See Patent Documents 2 and 3, for example)

[Patent Document 1] JP-A 2000-140190
[Patent Document 2] JP-A 2003-237670
[Patent Document 3] JP-A 10-23613

However, according to the technique disclosed in Patent Document 1, the rider's position on the vehicle is limited, operation is complex, and therefore, the rider tends to be preoccupied with the operation during the ride. Also, if the board is provided with sensors as suggested in Patent Documents 2 and 3, the load applied by the rider is distributed to positions which are located outside of the range of detection by the sensors, making it difficult to detect the load properly to control the vehicle. If the load is to be detected accurately in such a case, the number of sensors must be increased accordingly, resulting in increased cost.

SUMMARY OF THE INVENTION

In order to overcome the problems described above, preferred embodiments of the present invention provide a vehicle which is capable of detecting a load applied from the rider accurately without any influence from the rider's positions on the vehicle and road conditions, and has good operability.

According to a preferred embodiment of the present invention, a vehicle includes a load receiver having a first main surface arranged to receive a load from a rider, a load detector arranged to detect the load received by the load receiver, a wheel provided on a side of a second main surface of the load receiver and driven in accordance with the load detected by the load detector, a wheel support provided between the load receiver and the wheel and arranged so as to rotatably support the wheel, a first frame provided between the wheel support and the load receiver and connected with the wheel support, a second frame provided between the first frame and the load receiver and fixed to the load receiver, and a connecting member connecting an end region of the first frame with an end region of the second frame, enabling the second frame to pivot with respect to the first frame in directions that are substantially perpendicular to the first main surface of the load receiver. The load detector is sandwiched by the first frame and the second frame.

According to this preferred embodiment of the present invention, the first frame which is connected with the wheel support is connected with the second frame which is fixed to the load receiver via the connecting member, providing a kind of hinge mechanism for the second frame to pivot with respect to the first frame. The load detector is sandwiched by the first frame and the second frame. Therefore, as the rider rides on the load receiver or transfers his weight thereon, causing the load receiver to apply a load to the wheel, the second frame pivots slightly around the connecting member, and the load is mostly transferred to the load detector without escaping anywhere else. As a result, it is possible to accurately detect the load imparted by the rider, without influence from the riding position of the rider and road conditions. Thus, the rider can ride on the vehicle without worrying about where on the load receiver he should place his feet, and the rider can operate the vehicle naturally and easily as he wants, enjoying the ride itself very much without worrying about or paying attention to the operation. Further, the vehicle does not need many load detectors, which enables a reduction in cost.

Preferably, the first frame and the second frame position the connecting member closer to an outer end of the load receiver than the wheel. In this case, it becomes possible to provide a space at a lower surface central region of the load receiver. Therefore, if a drive controller, for example, is used to control the wheel, the drive controller may be disposed at the central region of the lower surface of the load receiver with a high level of freedom. Further, since the drive controller, for example, does not limit the mounting place for the connecting member and the load detector, the load detector can be disposed at a desired place.

Further, preferably, the second frame pivots with respect to the first frame in directions included in a plane which is substantially perpendicular to the first main surface of the load receiver and includes longitudinal directions of the load receiver. In this case, the second frame does not pivot in widthwise directions of the load receiver, and therefore a load applied in the widthwise directions is not detected. On the other hand, a vertical load applied from the load receiver to the wheel is all transferred via the load detector, and therefore it is possible to appropriately detect the load in this direction.

Further preferably, the vehicle further includes an urging member for urging the first frame toward the load receiver. In this case, it becomes possible to prevent the first frame from becoming too far away from the second frame.

Preferably, the load detector is defined by a strain gauge load cell or a capacitance sensor. In this case, it becomes possible to reduce cost.

Further, preferably, the load detector includes an elastic member and a position sensor for detecting displacement of the elastic member caused by the load. In this case again, it becomes possible to reduce cost.

According to another preferred embodiment of the present invention, a vehicle includes a load receiver having a first main surface for receiving a load from a rider, a load detector for detecting the load received by the load receiver, a wheel provided on a side of a second main surface of the load receiver and driven in accordance with the load detected by the load detector, a wheel support provided between the load receiver and the wheel for rotatably supporting the wheel, a first frame provided between the wheel support and the load receiver and connected with the wheel support, a second frame provided between the first frame and the load receiver and fixed to the load receiver, and a regulating member for regulating a position of the second frame, enabling the second frame to move in load detecting directions with respect to the first frame. The load detector is sandwiched between the first frame and the second frame.

According to this preferred embodiment of the present invention, the second frame receives position regulation so it can move in the load detecting directions, and the load detector is sandwiched by the first frame and the second frame. Therefore, as the rider rides on the load receiver or transfers his weight, causing the load receiver to apply a load to the wheel, the second frame moves, and the load is mostly applied to the load detector without escaping anywhere else. As a result, it is possible to accurately detect the load from the rider, without influence from the riding position of the rider and road conditions. Thus, the rider can ride on the vehicle without worrying about where on the load receiver he should place his feet, and the rider can operate the vehicle naturally and easily as he wants, and enjoy the ride itself very much without worrying about or paying attention to the operation. Further, the vehicle does not need many load detectors, which enables a reduction in cost.

Preferred embodiments of the present invention are suitably applicable to electric skateboards and other motor-driven small electric vehicles such as electric wheelchairs and electric carts. The above and other elements, features, characteristics and advantages of the present invention will become more apparent from the following detailed description of preferred embodiments thereof with respect to the attached drawings.

BRIEF DESCRIPTION OF THE DRAWINGS

FIG. 6 is a control block diagram of the electric skateboard in FIG. 1.

FIGS. 9(A) and 9(B) are schematic diagrams showing a primary portion of the electric skateboard in FIG. 8, in a side view of FIG. 9(A) and in a front view of FIG. 9(B).

FIGS. 10(A) and 10(B) are schematic diagrams showing a primary portion of an electric skateboard according to another preferred embodiment of the present invention, in a side view of FIG. 10 (A) and in a front view of FIG. 10(B).

DETAILED DESCRIPTION OF PREFERRED EMBODIMENTS

Hereinafter, preferred embodiments of the present invention will be described with reference to the drawings.

Figure 1:
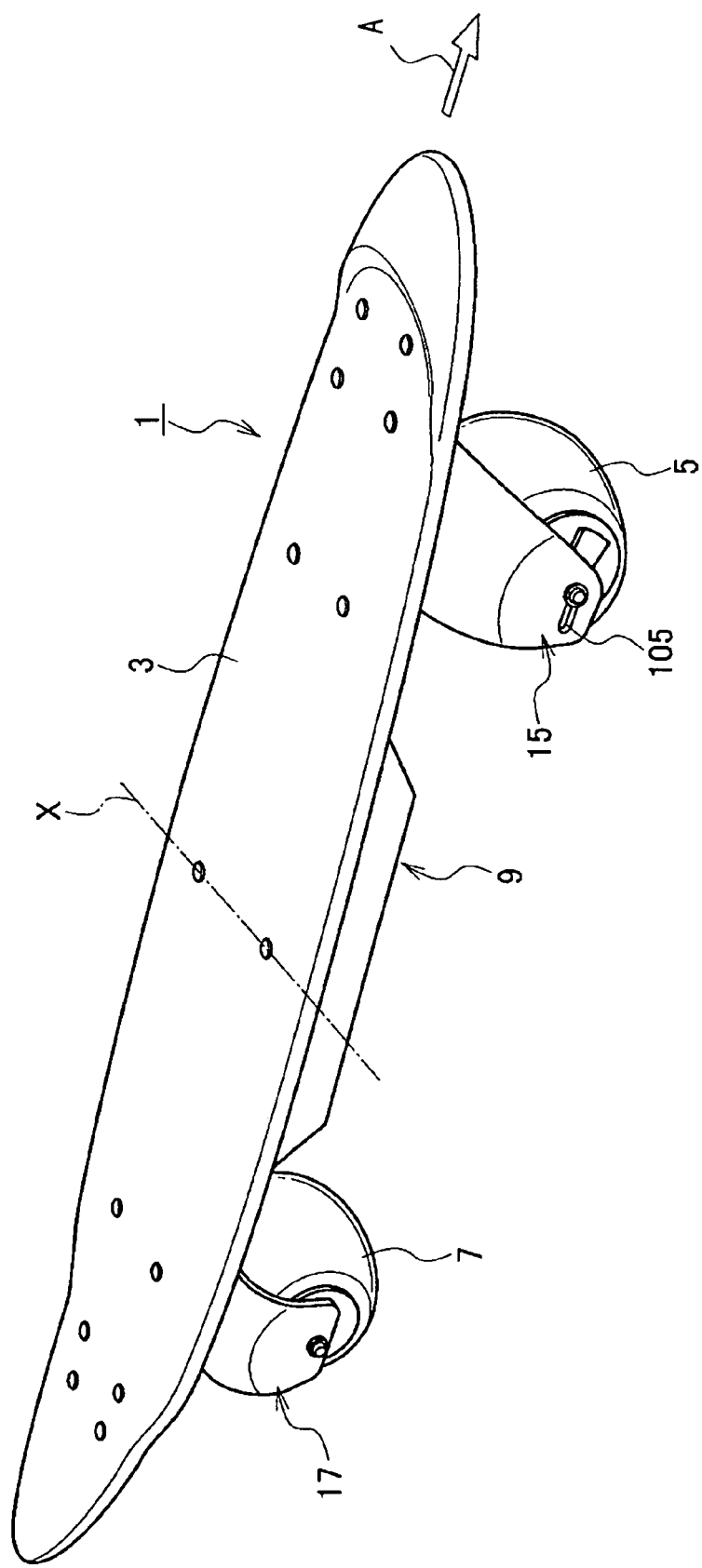
FIG. 1 is a perspective view showing an overall construction of an electric skateboard as a vehicle according to a preferred embodiment of the present invention.

FIG. 1 shows an electric skateboard 1 as a vehicle according to a preferred embodiment of the present invention.

In the following description, front, rear, right and left directions in the electric skateboard 1 are determined on the basis that a front wheel 5 is on the front side, which means that the direction indicated by Arrow A in FIG. 1 is the forward traveling direction. Upper and lower directions are determined from a driving state of the electric skateboard 1. In other words, upper and lower directions are determined on the basis of a state that the front wheel 5 and a rear wheel 7 are below a board 3.

Referring to FIG. 1, the electric skateboard 1 includes the board 3 serving as a load receiver which receives the load applied by the rider. The front wheel 5 and the rear wheel 7 are mounted on a lower surface of the board 3, on both longitudinal sides, via respective arms 15 and 17 as well as other parts. The arms 15 and 17 are wheel supports which provide rotatable support to the front wheel 5 and the rear wheel 7, respectively, and are formed generally in the shape of a U that is oriented downwardly in the vertical direction. At an approximate central region of the lower surface of the board 3 is a drive controller 9 which controls driving operation of the front wheel 5 and the rear wheel 7. In the present preferred embodiment, the front wheel 5 will serve as a free wheel whereas the rear wheel 7 will serve as a driving wheel. However, the front wheel 5 may serve as the driving wheel.

The board 3 is preferably made of wood, for example, but may be made of other materials. In order for the drive controller 9 to not receive an unwanted load caused by a flexure of the board 3 when the rider rides on the electric skateboard 1, the drive controller 9 is screwed, for example, generally at its central region, widthwise or perpendicularly to a longitudinal axis of the board 3 (in the direction of X axis in FIG. 1). However, the way in which the drive controller 9 is attached to the board 3 is not limited to this. For example, if the board 3 is made of rigid FRP (Fiberglass Reinforced Plastics), there is less necessity to take the flexure of the board 3 into account, and so the drive controller 9 may be attached rigidly to the board 3.

Figure 2:
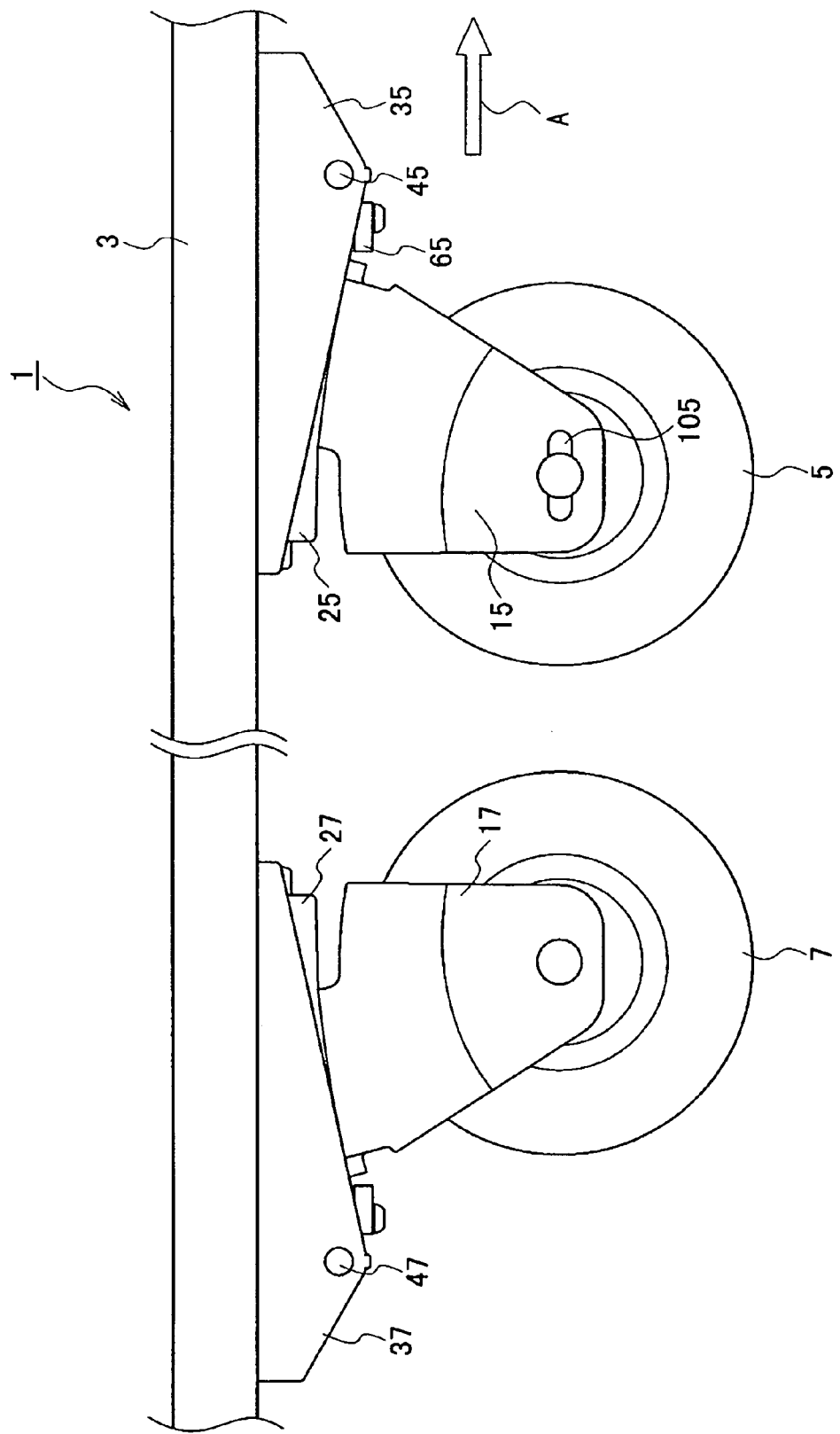
FIG. 2 is a side view illustrating how the wheels of the electric skateboard in FIG. 1 are attached.

FIG. 2 is a side view showing how the front wheel 5 and the rear wheel 7 are attached. It should be noted that the figure does not show ends or an intermediate region of the electric skateboard 1.

As shown in FIG. 2, the front wheel 5 and the rear wheel 7 are attached symmetrically with each other with respect to a plane which becomes vertical when the upper surface of the board 3 becomes horizontal. In the present preferred embodiment, this plane is a vertical plane which passes the X axis in FIG. 1, but the plane is not limited to this.

The arms 15 and 17 are connected with first frames or frames 25 and 27, respectively. The arm 15 is provided with generally oval long grooves 105 with their major axis oriented in the traveling directions of the electric skateboard 1. By varying a position in the long grooves 105 to attach the front wheel 5, the turning characteristic of the electric skateboard 1 is varied.

The frames 25 and 27 are connected with second frames, i.e. frames 35 and 37 which are fixed on the board 3, via rod members or shafts 45 and 47, respectively. As described, the front wheel 5 and the rear wheel 7 are attached to the board 3 via the respective arms 15 and 17 and other parts. The front wheel 5 and/or the rear wheel 7 have their outer surface central region bulged for providing a reliable turning characteristic.

The arms 15, 17 and the frames 25, 27, 35, 37 can be formed of iron, aluminum or other material.

Next, reference will be made to FIG. 3 and FIG. 4, to describe how the front wheel 5 is attached to the board 3. It should be noted here that attaching construction of the rear wheel 7 to the board 3 is preferably the same as of the front wheel 5, so description will not be repeated. FIG. 4 is a perspective view of the electric skateboard 1 as inverted upside down from the state in FIG. 1 and viewed obliquely from below the front wheel 5.

The arm 15 rotatably supports the front wheel 5 with respect to the traveling directions of the electric skateboard 1. The arm 15 has a columnar connector 151 protruding from near its upper region (at the bottom region of the U), and a projection 153 formed on a side surface of the connector 151. At a longitudinal central region of the connector 151, a hollow 155 which can be penetrated by an arm shaft 115 is provided.

The frame 25 includes a loose-fit recess 251 for the connector 151 of the arm 15 to loosely fit in, an arm connection hole 253 which is a through hole formed at a bottom central region of the loose-fit recess 251 for penetration by the arm shaft 115, a shaft through hole 255 for penetration by the shaft 45, and a cutout 257 formed in the loose-fit recess 251.

When assembled, the connector 151 is loosely fitted into the loose-fit recess 251 so that the projection 153 is in the cutout 257. In this state, the arm shaft 115 is inserted into the arm connection hole 253, the hollow 155, and then a hole 851 of a plate 85, and a bolt 157 is threaded to an end of the arm shaft 115, whereby the frame 25 is connected with the arm 15. Further, the plate 85 is fixed to the connector 151 by inserting a bolt 852 into another set of holes in the plate 85 and the connector 151 and by threading a nut 853 onto the bolt 852.

By assembling these elements as described above, the arm 15 and the arm shaft 115 pivot integrally with each other around the arm shaft 115. Accordingly, the front wheel 5, which is connected with the arm 15, pivots and enables the electric skateboard 1 to turn. When the arm 15 is connected with the frame 25, the projection 153 formed on the connector 151 serves as a stopper which defines a range for pivotal movement of the arm 15 around the arm shaft 115. Therefore, the arm 15, i.e. the front wheel 5, is able to pivot around the arm shaft 115 within the range in which the projection 153 pivots in the cutout 257.

Figure 3:
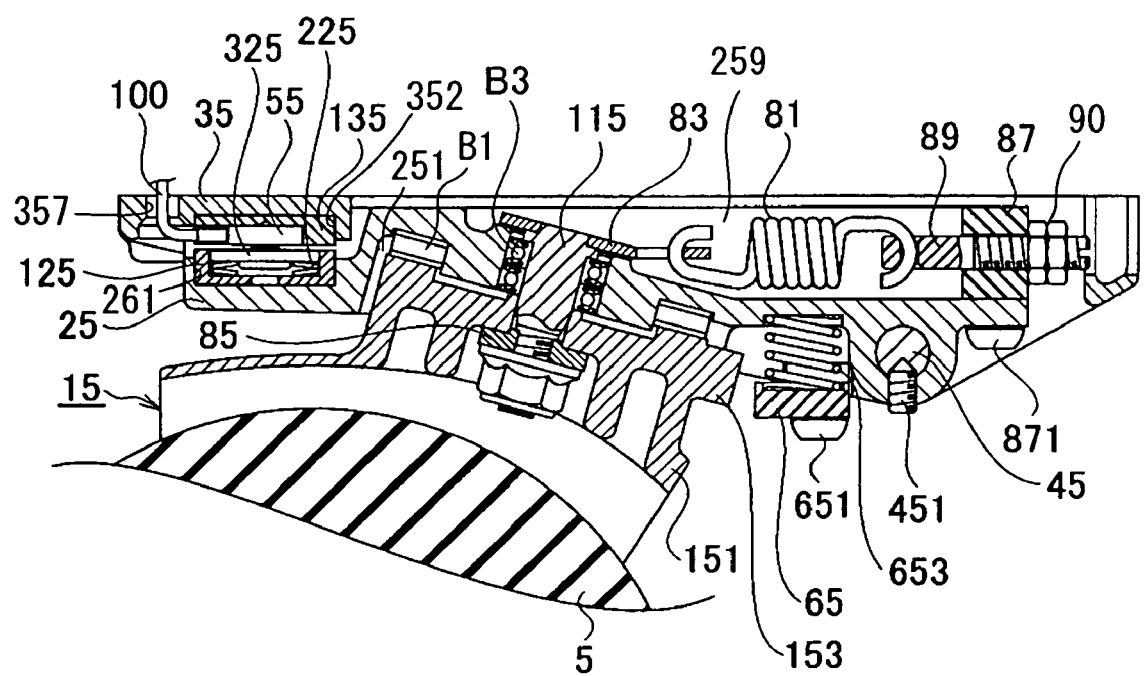
FIG. 3 is a partial sectional view showing in detail how a front wheel of the electric skateboard in FIG. 1 is attached.
Figure 4:
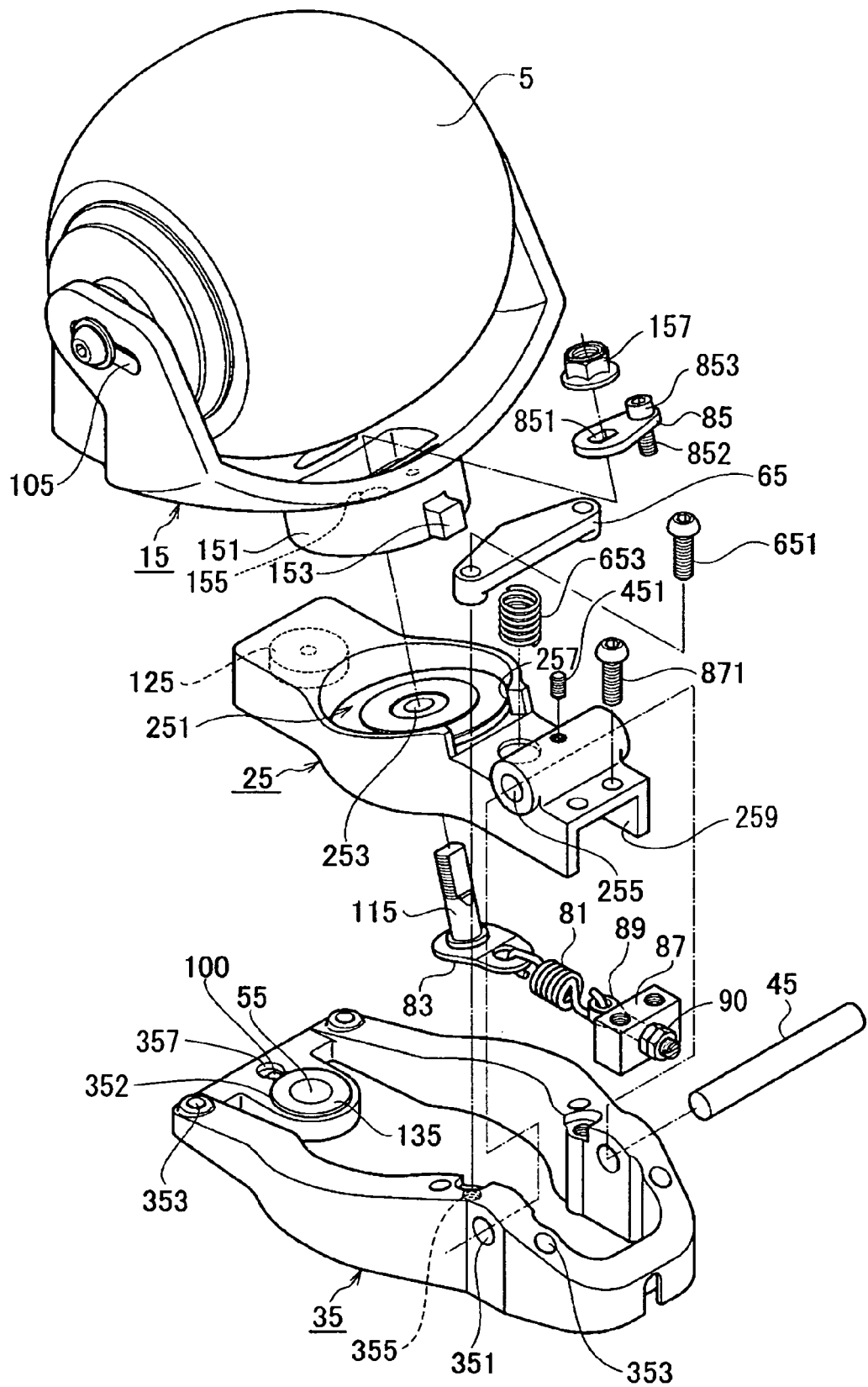
FIG. 4 is an exploded perspective view showing in detail how the front wheel of the electric skateboard in FIG. 1 is attached.

As shown in FIG. 3, a bearing B1 is inserted in a gap between a bottom surface of the loose-fit recess 251 and the connector 151 of the arm 15. Also, a bearing B3 is inserted in a gap between the arm connection hole 253 and the arm shaft 115 inserted therein. The bearings B1, B3 allow the arm shaft 115 to pivot smoothly.

Next, description will be given for a main surface of the frame 25 which is a surface that is spaced away from a main surface formed with the loose-fit recess 251.

In this main surface, a recess 259 is arranged to extend from a generally central region to an end which is closer to the shaft through hole 255. The recess 259 can accommodate a steering member (to be described later) which is connected with a base end of the arm shaft 115. Also on this main surface, a columnar groove 261 (See FIG. 3) is formed near an end which is spaced away from the recess 259. The groove 261 is fitted by a concave holder 125.

The frame 25 is connected, via the shaft 45, with the frame 35, which is shaped so that it can accommodate the frame 25 in its inner space, and has generally a rectangular horizontal cross section whose longer sides extend longitudinally of the board 3. With this arrangement, at least longitudinal inner side surfaces of the frame 35 are formed to have generally the same shape as longitudinal outer side surfaces of the frame 25. Therefore, moving directions of the frame 35 are determined. Right and left side surfaces (outer side surfaces) of the frame 35 as attached to the board 3, are each formed with a shaft through hole 351 closely to an end thereof, for penetration by the shaft 45.

Further, at a location in the frame 35 to be faced by the groove 261 when the frames 25 and 35 are assembled together, (i.e., at a location closer to an end spaced away from the end closer to the shaft through hole 351), there is formed a columnar groove 352 which has the same diameter as the groove 261. The groove 352 is fitted by a concave holder 135.

The frame 35 has a wavy end edge provided with mounting holes 353. The mounting holes 353 are through holes extending in vertical directions so that bolts or pins can be inserted when assembling the frame 35 with the board 3. In the present preferred embodiment, as shown in FIG. 1 and FIG. 4, a total of six mounting holes 353 are preferably provided, but the number of the holes is not limited to this and may be appropriately varied depending on the shape and size of the frame 35.

To the frame 35 as described above, the frame 25 is fitted in, then the shaft 45 is inserted into the shaft through holes 255 and 351, and a fixing screw 451 is threaded from a side surface of the shaft through hole 255 to fix the shaft 45, whereby the frames 25 and 35 are joined together. The shaft 45 is perpendicular to the longitudinal direction of the board 3. Therefore, pivoting directions of the frame 35 with respect to the frame 25 are included in a plane which is perpendicular to the riding surface on the board 3 and includes the longitudinal directions of the board 3.

Referring to FIG. 3, a disc spring 225 is attached to the holder 125 which is fitted into the groove 261 of the frame 25, to provide suspension. Further, a buffer member 325 provided by a rubber bush for example, is disposed above the disc spring 225 for adjustment so that an appropriate load will be applied to a load detection sensor (load detector) 55 which detects the load applied to the board 3.

On the other hand, the load detection sensor 55 is attached to the holder 135 which is fitted into the groove 352 of the frame 35, and a hole 357 is formed near the groove 352 to insert a lead wire 100 which sends signals from the load detection sensor 55 to the drive controller 9.

Therefore, as the frames 25 and 35 are assembled together, the load detection sensor 55 is sandwiched between the two frames 25, 35, and the load detection sensor 55 has its bottom surface contacting an upper surface of the buffer member 325. The holders 125 and 135 as a whole represent a sensor housing region.

The load detection sensors are preferably disposed longitudinally of the vehicle, closer to the vehicle center than wheel supports, i.e. at a place closer to the vehicle center than the places where wheels are attached to the load receiver (the board).

The load detection sensor 55 is defined by, e.g. a strain gauge load cell (e.g. manufactured by NEC San-ei Instruments Ltd., Product Number 9E01-L42), which converts strain into electric signals when a load from outside pressurizes the sensor material to cause the strain.

Further, a holder 65 is attached at a lower region of the frame 25. The holder 65 has two ends each formed with a hole to insert a bolt 651 in the vertical direction. The bolts 651 inserted into these holes are threaded into bolt holes 355 formed in the frame 35. As a result, the frame 25 comes between the holder 65 and the frame 35.

Further, the frame 25 and the holder 65 have mutually opposed surfaces, and a counter bore is formed at a generally central region on each of the opposed surfaces. These counter bores are fitted by ends of a spring (damper or cushion) 653 which serves as an urging member for urging the frame 25 toward the board 3. Thus, elastic force from the spring 653 can be applied directly to the frame 25 without loss.

As described above, by attaching the holder 65 to the frame 25 and placing the spring 653 between the two for urging the frame 25, it becomes possible to prevent the gap between the frame 25 and the frame 35 from becoming too large.

Further, the mechanism described above enables to detect the load accurately, using practically one sensor per detecting position (where a foot is placed).

Next, description will be made for the steering member which pivots the front wheel 5.

A tension spring 81 which determines steering characteristic in turning operations is connected with the base end of the arm shaft 115 via a thin connecting member 83. The connecting member 83 is welded, for example, to the base end of the arm shaft 115.

The tension spring 81 has its two ends shaped into hooks so they can connect to a through hole for example. One of the ends is hooked to a hooking hole provided in the connecting member 83 while the other end is hooked to a hooking hole in a hooking shaft 89 which penetrates the connecting member 87. The hooking shaft 89 has two ends; one formed with a hooking hole and the other formed with a thread. By inserting the hooking shaft 89 into the connecting member 87 and threading a double nut 90 on the thread of the hooking shaft 89, the hooking shaft 89 is fastened to the connecting member 87. Tightening or loosening the double nut 90 varies tension in the tension spring 81 and thus the steering characteristic appropriately. The connecting member 87 is fastened by a screw 871 to the frame 25. When assembling, the steering member is disposed in the recess 259 of the frame 25.

It should be noted here that the above-described construction of the steering member involving the tension spring 81, the connecting members 83, 87, the hooking shaft 89 and the double nut 90 represents only one example, and may be varied in many ways within the scope of the present invention.

Figure 5:
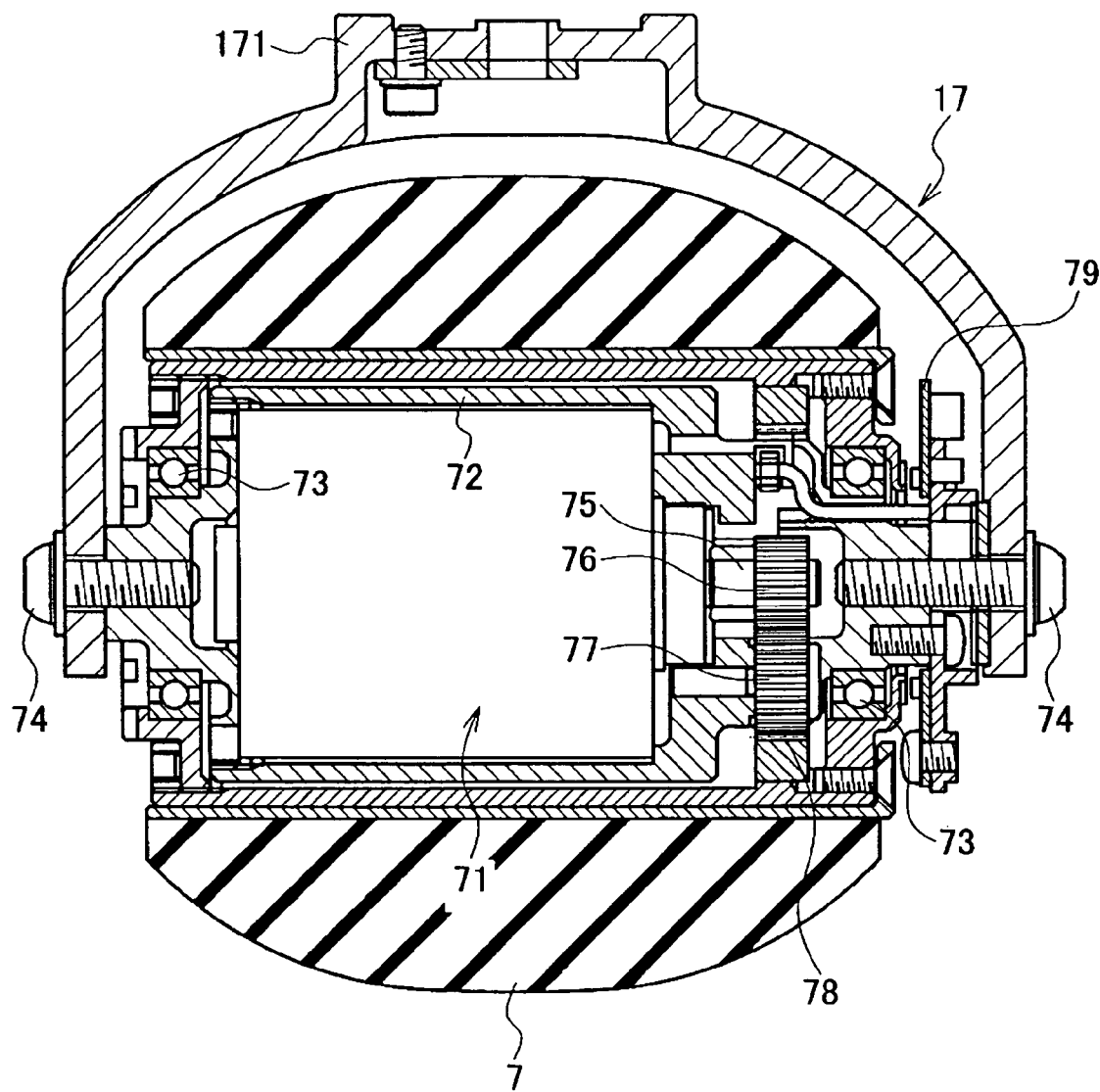
FIG. 5 is a partial sectional view showing an inside construction of a drive wheel of the electric skateboard in FIG. 1.

Next, reference will be made to FIG. 5, to describe the driving wheel or the rear wheel 7.

The rear wheel 7 is preferably made of rubber, resin and so on, and has a shape like an ellipsoid which has its two ends cut off in the vertical direction. A fixed sleeve 72 is provided inside the rear wheel 7, and a drive motor 71 is placed inside the fixed sleeve 72. The fixed sleeve 72 has two sides each provided with a bearing 73. The bearings 73 allow the rear wheel 7 to turn. The fixed sleeve 72 is connected with the arm 17 via a drive wheel mounting shaft 74. The drive wheel mounting shaft 74 is provided with an encoder 79 which detects the number of revolution or angle of rotation of the rear wheel 7 based on shaft displacement during the ride.

Like the arm 15 which has been described earlier, the arm 17 has its upper portion (i.e., the bottom portion of the U) provided with a joint 171 protruding therefrom. The joint 171 is penetrated by an arm shaft (not illustrated), and the arm 17 is pivotable around the arm shaft.

The drive motor 71 is controlled based on signals from the drive controller 9, and a drive gear 76 is inserted around the motor shaft 75. The drive gear 76 engages with a middle gear 77, and the middle gear 77 engages with an internal gear 78 which is provided inside the rear wheel 7, whereby a rotary power in accordance with gear ratios between the gears is transferred to the rear wheel 7 to move the electric skateboard 1.

In the present preferred embodiment, the front wheel 5 preferably serves as a free wheel, so there is no need to provide a drive motor or gears inside the front wheel 5. However, if the front wheel 5 serves as a drive wheel, the front wheel 5 will be provided with the same construction as has been described for the rear wheel 7.

Next, description will be made as to how the electric skateboard 1 is controlled, with reference to a block diagram in FIG. 6.

As shown in FIG. 6, the drive controller 9 includes a controller 91 and a battery 93 which serves as a power source. The controller 91 includes a CPU (Central Processing Unit) 911 and a driver 912. The CPU 911 is supplied with: a voltage at a voltage dividing point P of a voltage divider circuit which is defined by a series connection of the load detection sensor 55 and a load detection sensor 57 which detects a load applied to the rear wheel 7; a voltage from the encoder 79 provided in the rear wheel 7, indicating shaft displacement (speed) of the rear wheel 7; and a drive current of the drive motor 71 supplied from a feedback circuit F.

The load detection sensors 55 and 57, when they are defined by strain gage load cells, each include a resistor wire therein, and the resistor wires in both load detection sensors preferably have the same resistance characteristic. The resistance values are constantly monitored by a predetermined means.

A load applied to the front wheel 5 is detected by the load detection sensor 55. When there is a load applied on the fore foot of the rider (the rider's foot which is placed ahead of the other foot on the board 3 with respect to the moving direction), the resistor wire in the load detection sensor 55 is distorted, and its resistance value decreases in inverse proportion to the load. Likewise, a load applied to the rear wheel 7 is detected by the load detection sensor 57. When there is a load applied on the rear foot of the rider (the rider's foot which is placed behind the other foot on the board 3 with respect to the moving direction), its resistance value decreases in inverse proportion to the load. Therefore, when there is no load or the same amount of load applied on both of the load detection sensors 55 and 57, the voltage at the voltage dividing point P becomes a half of voltage divider circuit source voltage V, i.e. ($\frac{1}{2}$)V.

On the other hand, when the rider transfers his weight, to increase the load on the load detection sensor 55 over the load on the load detection sensor 57, the voltage becomes higher than ($\frac{1}{2}$)V, by the amount proportional to the difference between the loads detected by the two load detection sensors. On the contrary, when the load on the load detection sensor 55 becomes smaller than the load on the load detection sensor 57, the voltage becomes lower than ($\frac{1}{2}$)V, by the amount proportional to the difference between the loads detected by the two load detection sensors.

The CPU 911 generates drive command signal (PWM: Pulse Width Modulation signal) whose pulse width represents the voltage at the voltage dividing point P, and sends the signal to the driver 912 at the next stage of the circuit.

Based on the drive command signal (PWM signal) from the CPU 911, the driver 912 outputs a drive current to the drive motor 71, thereby driving the drive motor 71 to turn the rear wheel 7.

Moving direction and/or moving speed of the electric skateboard 1 are determined as follows, based on outputs from the load detection sensors 55 and 57.

When the rider transfers his weight to his fore foot on the board 3, the CPU 911 sends to the driver 912 a drive command signal which has a pulse width representing the difference between the loads on the forward and rearward feet as has been described above. The drive motor 71 is supplied with a drive current corresponding to the pulse width, and begins to accelerate forward speed or decelerate rearward travel.

On the other hand, when the rider transfers his weight to his rear foot on the board 3, the CPU 911 sends to the driver 912 a drive command signal which has a pulse width representing the difference between the loads on the forward and rearward feet (a drive command signal which has a reverse amplitude of the amplitude when the weight transfer is to the fore foot). The drive motor 71 is supplied with a drive current corresponding to the pulse width, and begins to decelerate forward speed or accelerate rearward travel.

When the rider gets off the electric skateboard 1, the load detection sensors 55 and 57 have a maximum resistance value, which stops the CPU 911 from sending drive control signals to the driver 912, and thus the drive motor 71 ceases operation.

It should be noted here that the rotating speed of the driving wheel or the rear wheel 7 is constantly detected by the encoder 79 whereas the drive current to the drive motor 71 is detected by the feedback circuit F. The detected values are constantly inputted to the CPU 911. Therefore, it is possible to prevent excessive speeding and sudden acceleration by providing an appropriate speed controller which works with the detected values.

According to the electric skateboard 1 as has been described, the frames 25 and 35 are connected with each other via the shaft 45, a kind of hinge structure is formed in which the frame 35 is capable of pivoting with respect to the frame 25, and the load detection sensor 55 is sandwiched between the frames 25 and 35. Therefore, when there is a load applied from the board 3 to the front wheel 5 upon riding on the board 3 or weight transfer by the rider, the frame 35 makes a slight pivoting action around the shaft 45, and the load is mostly transferred to the load detection sensor 55 without escaping anywhere else. Likewise, the frames 27 and 37 are connected with each other via the shaft 47, the frame 37 is capable of pivoting with respect to the frame 27 via a kind of hinge structure, and the load detection sensor 57 is sandwiched between the frames 27 and 37. With the construction described above, the frame 37 can move in the load detecting directions with respect to the frame 27. Therefore, when there is a load applied from the board 3 to the rear wheel 7 upon riding on the board 3 or weight transfer by the rider, the frame 37 makes a slight pivoting action around the shaft 47, and the load is mostly transferred to the load detection sensor 57 without escaping anywhere else. As a result, it is possible to accurately detect the load and weight transfer from the rider, regardless of the riding position of the rider and road conditions.

Particularly, in the electric skateboard 1, the hinge mechanism is constructed so that pivoting direction of the frame 35 with respect to the frame 25 is included in a plane which is substantially perpendicular to the upper surface (the riding surface) of the board 3 and includes the longitudinal direction of the board 3. Likewise, the other hinge mechanism is constructed so that pivoting direction of the frame 37 with respect to the frame 27 is included in a plane which is substantially perpendicular to the upper surface (the riding surface) of the board 3 and includes the longitudinal direction of the board 3. In other words, the frames 35, 37 are fixed so as not to pivot in the widthwise directions of the board 3 (directions that are substantially perpendicular to the vehicle moving directions) so that no loads from the widthwise directions will be detected. On the other hand, vertical loads applied from the board 3 to the front wheels 5, 7 are transferred via the load detection sensors 55, 57, respectively, so it is possible to appropriately detect loads in these directions.

Thus, the rider can ride on the electric skateboard 1 without worrying about where on the board 3 he should place his feet, and the rider can control the drive of the electric skateboard 1 naturally, easily and accurately as he wants, and enjoy the ride itself very much without worrying about or paying attention to the operation.

Further, by arranging the frames 25, 35 in such a way that the shaft 45 is closer to the outer end of the board 3 than is the front wheel 5, and by arranging the frames 27, 37 in such a way that the shaft 47 is closer to the other outer end of the board 3 than is the rear wheel 7, it becomes possible to create a space at a center region in the lower surface of the board 3. This offers a high level of freedom in positioning the drive controller 9 at a central region in the lower surface of the board 3. Also, it allows placing of the load detection sensors 55, 57 at desired locations.

Further, according to the present preferred embodiment, the rider should only transfer his weight in order to control speed and to switch between forward and reverse travels, and there is no need to limit the location where the rider should place his feet. Thus, the rider can turn and run the electric skateboard 1 while maintaining his balance by using his hands. Therefore, it becomes possible to provide the same riding comfort as of ordinary non-electric skateboard, together with the speed and operability achievable only by the use of motor drive.

Further, according to the electric skateboard 1 described thus far, wheels are attached to the board 3 using a very simple construction, and assembling is easy. In addition, since only one load detection sensor is required per wheel, cost can be reduced, and by using a strain gauge load cell as the load detection sensors 55, 57, the cost can be reduced further.

Next, reference will be made to FIGS. 7(A)–7(C), to describe a case when turning is performed during the ride on the electric skateboard 1. In this case, the rider twists his body for example, thereby transfer his weight in the widthwise directions of the board 3 (directions of X axis in FIG. 1), to tilt the board 3 and turn the electric skateboard 1, with the right or left side surface of the board which has become closer to the road surface facing inside (the center of turning).

Figure 7C:
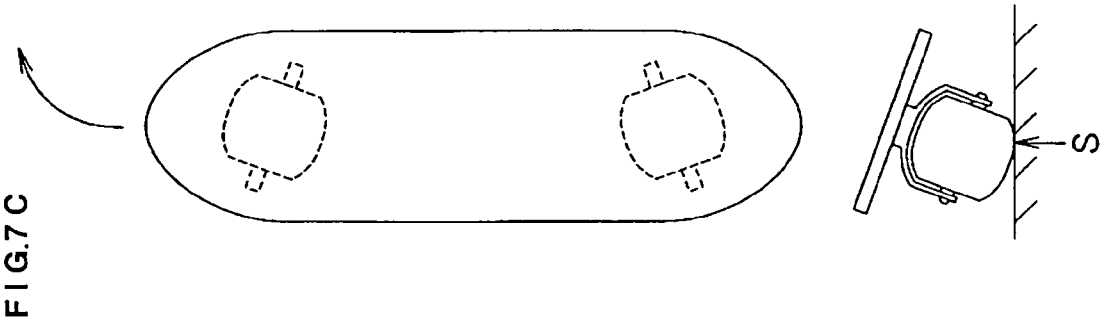
FIGS. 7(A)–7(C) are conceptual diagrams illustrating a straight travel path in FIG. 7(A), a left turn in FIG. 7(B) and a right turn in FIG. 7(C) of the electric skateboard in FIG. 1.
Figure 7B:
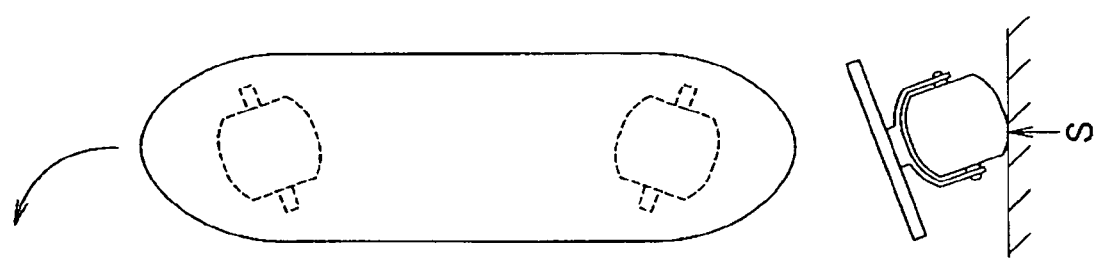
Figure 7A:
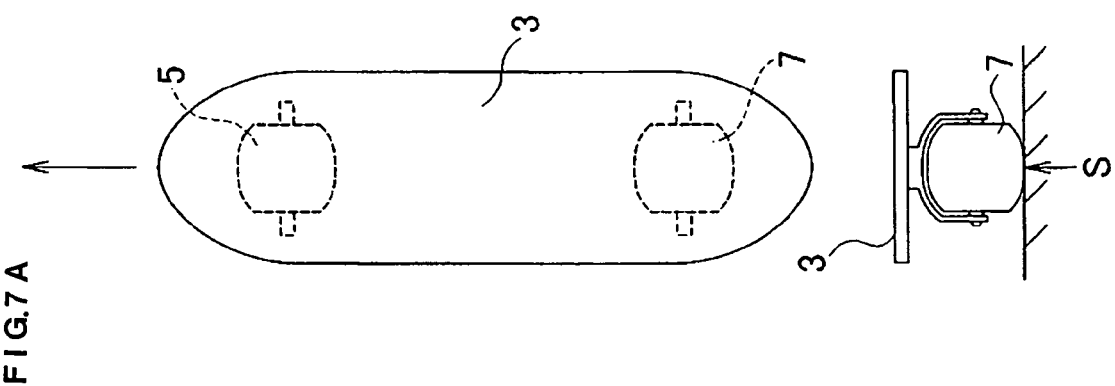

FIGS. 7(A)–7(C) are conceptual diagrams illustrating how the wheels behave during a turn. The diagrams give views from above and rear during a straight travel (FIG. 7(A)), a left turn (FIG. 7(B)) and a right turn (FIG. 7(C)) of the electric skateboard 1. As shown in these diagrams, when the rider transfers his weight to tilt the board 3 in one of the widthwise directions, a steering force works on the tilted side, making rotation axes of the front wheel 5 and the rear wheel 7 unparallel and coming closer to each other to cross on the tilted side. As a result, the electric skateboard 1 turns about a turning axis represented by a vertical line which passes the intersection made by the two rotation axes of the wheels. The turning radius depends on the extent of weight transfer. In other words, the way the rider puts his weight changes where on the contact surface S will make contact with the road, determining in which direction the board will be after the turning.

As described, when turning the electric skateboard 1, weight transfer is made in the widthwise directions of the board 3. Since there is no load detection provided in the widthwise directions according to the present preferred embodiment, no sudden acceleration or deceleration is made during the turning, which makes it possible to further increase safety during the ride.

On the other hand, the rider can make turns naturally, enjoy reaction from the change in the contact surface S caused by the weight transfer he has made, and change his posture in accordance with the change thereby varying the ride in many different ways, or play with advanced levels of technique.

For the sake of reference, the surface of the front and rear wheels, which is generally ellipsoidal, may have a gentler curved surface so that each center of curvature radius comes higher than the rider's center of gravity. This will give more stability in the ride on the electric skateboard 1.

In the preferred embodiment described above, the load detection sensors 55, 57 are not limited to the strain gauge load cell, but may be defined by electrical capacitance sensors, pressure-sensitive resistor or many other kinds of pressure sensors. An example of the capacitance sensor is PicoForce (Product ID: PD3-30) manufactured by Nitta Corporation. An example of the pressure-sensitive resistor is FSR (Product ID) manufactured by Interlink Electronics K.K.

In the preferred embodiment described above, details of the sensor housing region will be varied depending on the shape of load detection sensor 55, except for the following common construction that the sensor housing region is provided between the frames 25 and 35, and the load detection sensor 55 is sandwiched between the frames 25 and 35. The load detection sensor 55 may be placed anywhere as long as it is sandwiched by the frames 25 and 35. The same applies to the load detection sensor 57.

The hinge mechanism including the shaft 45 may be placed anywhere as long as the shaft 45 is not on a line connecting the board 3 and the wheel. For example, the shaft 45 may be placed more inwardly than the wheel. The hinge maybe placed on the upper surface of the board 3. The same applies to the shaft 47.

Figure 8:
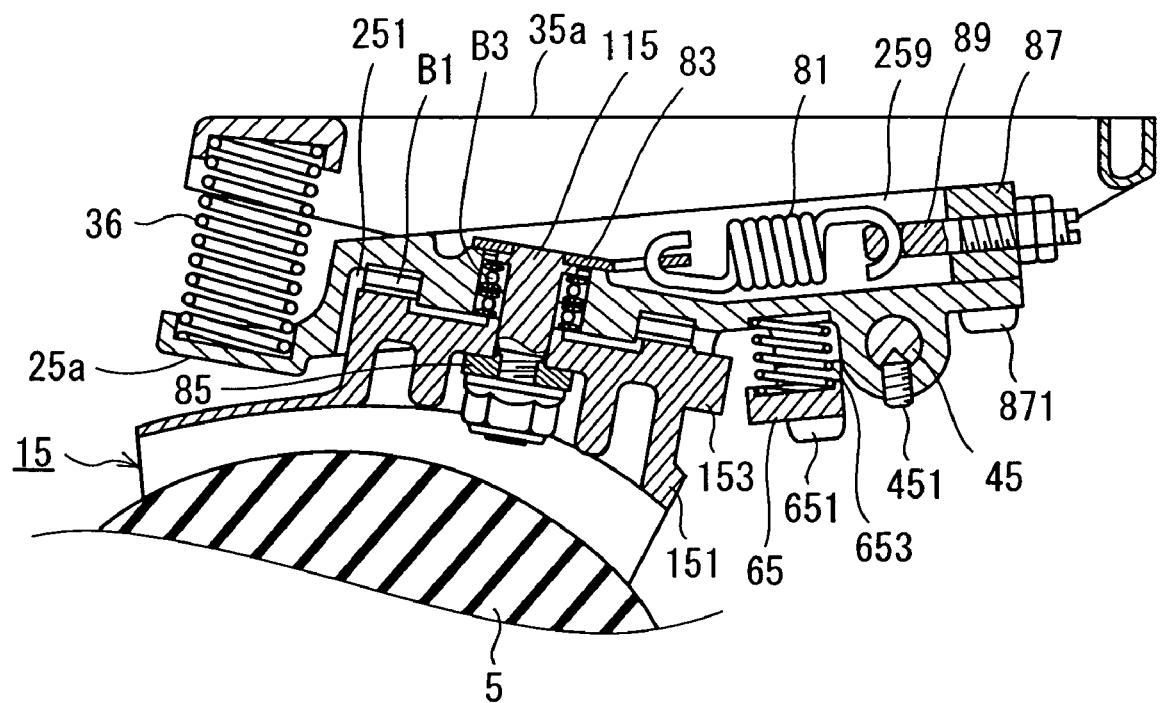
FIG. 8 is a partial sectional view showing in detail how a front wheel of an electric skateboard according to another preferred embodiment of the present invention is attached.

Further, as shown in FIG. 8 and FIGS. 9(A) and 9(B), the load may be detected by using a spring 36 as an elastic member and a position sensor 361 which detects displacement of the spring 36 due to the load from the rider.

In this case, a frame 25*a* and a frame 35*a* which is attached to the board 3 are connected together with the shaft 45, and the spring 36 is inserted between tip portions of the two frames 25*a* and 35*a*. The position sensor 361 is supported by a sensor support 362 which is fastened to a side surface of a shaft 45 using a bolt 363. The position sensor 361 is provided with a slit, and a strip member 364 is movable in left and right directions within the slit. The position sensor 361 detects displacement of the strip member 364 in the sensor longitudinal directions (directions indicated by Arrow C) within the slit, thereby detecting the load applied to the board 3. An end of the shaft 45 protrudes out of the side surface of the frame 35*a*, and is fitted by an end of a connecting-rod-like connecting member 365. The connecting member 365 is integrated with the shaft 45, and thus with the frame 25*a*, by a screw 366. The connecting member 365 is not fixed to the frame 35*a*. The connecting member 365 has its other end provided with a retaining member 367 which is fixed with a hardware 368. The retaining member 367 has a head penetrated by a strip member 364, and the strip member 364 is held by the retaining member 367.

With such a construction as described above, when a load is applied to the board 3, the frame 35a pivots around the frame 45 downwardly in the direction indicated by Arrow D (See FIG. 9(A)), compressing the spring 36. Although the connecting member 365 itself does not move in this step, the position sensor 361 moves with the frame 35*a*, varying the position of the strip member 364 within the position sensor 361 (Displacement occurs in the right direction along Arrow C). The position sensor 361 senses the amount of displacement of the strip member 364 that has occurred in the sensor longitudinal directions, thereby detecting the load applied on the board 3.

The above-described construction can be applied either of the front wheel 5 and the rear wheel 7.

If the load detection mechanism is constructed as described above, cost can be reduced further.

Further, as shown FIG. 10, a potentiometer 381 may be used in the load detection from the rider.

The potentiometer 381 has a gear 382. The gear 382 is opposed to a side surface of the frame 35*a* and is attached to the side surface of the frame 35*a* with two bolts 383. The potentiometer 381 detects the amount of movement (rotation) of the gear 382, thereby detects the load applied to the board 3. An end of the shaft 45 protrudes out of the side surface of the frame 35*a*, and is fitted by a connecting member 384. The connecting member 384 is integrated with the shaft 45, and thus with the frame 25*a*, by a screw 385. The connecting member 384 is not fixed to the frame 35*a*. The connecting member 384 has an end formed with a gear, which engages with the gear 382.

With such a construction as described above, when a load is applied to the board 3, the frame 35*a* pivots around the frame 45 downwardly in the direction indicated by Arrow D (See FIG. 10(A)), compressing the spring 36. Although the connecting member 384 itself does not move in this step, the potentiometer 381 moves with the frame 35*a*, and the gear 382 of the potentiometer 381 moves (rotates) on the gear of the connecting member 384 in a counterclockwise direction. The potentiometer 381 senses the amount of movement of the gear 382, thereby detecting the load applied on the board 3.

The above-described construction can be applied either of the front wheel 5 and the rear wheel 7.

If the load detection mechanism is constructed as described above, cost can be reduced.

Figure 11:
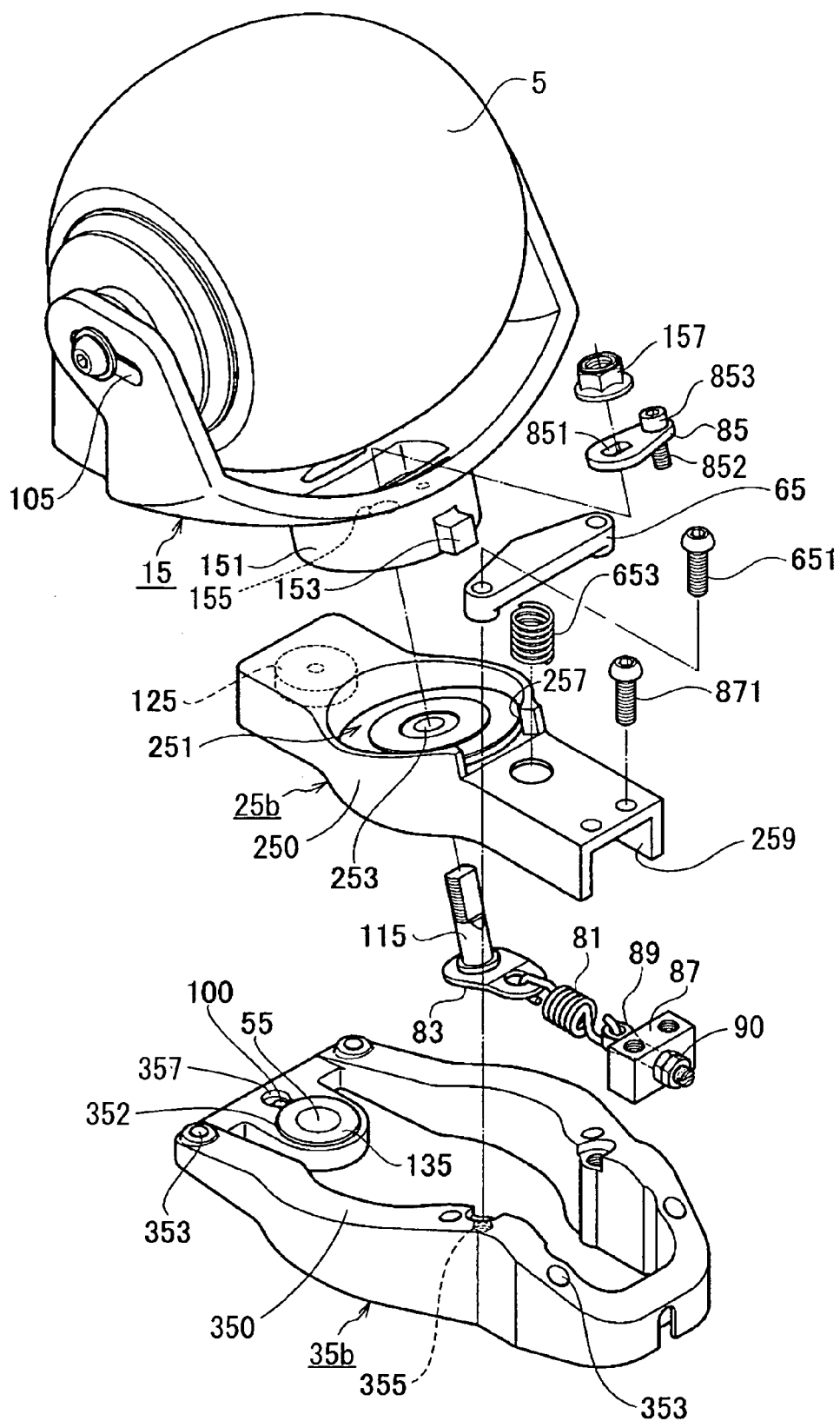
FIG. 11 is an exploded perspective view showing in detail how a front wheel of an electric skateboard according to another preferred embodiment of the present invention is attached.

FIG. 11 shows a primary portion of another preferred embodiment of the present invention.

In the present preferred embodiment, a frame 25*b* is fitted into a frame 35*b* without the shaft 45. The frame 25*b* and the frame 35*b* have their respective central regions 250 and 350 bulged generally equally to each other, slightly in the widthwise directions. Therefore, after being fitted to each other, the frame 35*b* is able to move vertically with respect to the frame 25*b*, but not in horizontal directions. In the present preferred embodiment, the central region 250 of the frame 25*b* serves as a regulating member which regulates the position of the frame 35*b* with respect to the frame 25*b* so that the frame 35*b* can move in the load detecting directions with respect to the frame 25*b*. Other arrangements are the same as in the preferred embodiment shown in FIG. 4, so description will not be repeated. The same construction is used for the rear wheel 7.

According to the present preferred embodiment, position regulation is provided to the frame 35b so that it is movable in the load detecting directions, and a load detection sensor 55 is arranged so as to be sandwiched by the frames 25b and 35b. Therefore, when there is a load applied from the board 3 to the front wheel 5 upon riding on the board 3 or weight transfer by the rider, the frame 35b moves toward the frame 25b, and the load is mostly transferred to the load detection sensor 55 without escaping anywhere, enabling to detect the load from the rider. The same applies to the rear wheel 7. In the present preferred embodiment, detection accuracy may be slightly lower than in the preferred embodiment shown in FIG. 4. However, since there is no need to connect the two frames, assembling becomes easier and cost can be reduced.

In the electric skateboards so far described, control is provided only of the speed, acceleration and switching between forward and rearward travels, whereas turning and steering are achieved through the rider's weight transfer in the board widthwise directions. However, if the front wheel 5 is also provided with the same construction as the rear wheel 7, so as to serve as a drive wheel, it becomes possible to provide electric control of steering.

Further, the power from the drive motor can be utilized as an assisting drive power.

Still further, the load detection sensor may be provided only on the front wheel side or the rear wheel side, and the drive motor may be controlled based on the load applied to the sensor-equipped wheel.

The present invention is applicable also to vehicles with a single wheel or with three or more wheels.

Further, the present invention is applicable not only to electric skateboards but to other vehicles such as electric wheelchairs and electric carts. Obviously in these cases, a variety of design changes will be made within the scope of the present invention, in accordance with specific applications of each vehicle.

The present invention being thus far described and illustrated in detail, it is obvious that the description and drawings only represent an example of preferred embodiments of the present invention, and should not be interpreted as limiting the invention. The spirit and scope of the present invention is only limited by the terms and scope of the following claims.

The invention claimed is:

1. A vehicle comprising:
    a load receiver including a first main surface arranged to receive a load from a rider;
    a load detector arranged to detect the load received by the load receiver;
    a wheel provided on a side of a second main surface of the load receiver and driven in accordance with the load detected by the load detector;
    a wheel support provided between the load receiver and the wheel and arranged to rotatably support the wheel;
    a first frame provided between the wheel support and the load receiver and connected with the wheel support;
    a second frame provided between the first frame and the load receiver and fixed to the load receiver; and
    a connecting member connecting an end region of the first frame with an end region of the second frame, enabling the second frame to pivot with respect to the first frame in directions that are substantially perpendicular to the first main surface of the load receiver; wherein
    the load detector is sandwiched by the first frame and the second frame.

2. The vehicle according to claim 1, wherein the first frame and the second frame position the connecting member closer to an outer end of the load receiver than the wheel.

3. The vehicle according to claim 1, wherein the second frame pivots with respect to the first frame in directions included in a plane which is substantially perpendicular to the first main surface of the load receiver and includes longitudinal directions of the load receiver.

4. The vehicle according to claim 1, further comprising an urging member arranged to urge the first frame toward the load receiver.

5. The vehicle according to claim 1, wherein the load detector includes at least one of a strain gauge load cell, an electric capacitance sensor and a potentiometer including a gear.

6. The vehicle according to claim 1, wherein the load detector includes an elastic member and a position sensor arranged to detect displacement of the elastic member caused by the load.

7. The vehicle according to claim 1, further comprising a drive controller operatively connected to the wheel to drive the wheel.

8. The vehicle according to claim 1, wherein the load receiver is a board and the wheel support includes an arm.

9. The vehicle according to claim 8, wherein the arm includes at least one groove arranged to contain the wheel in a variable position so as to change a turning characteristic of the vehicle.

10. The vehicle according to claim 1, wherein the connector member is defined by a hinge mechanism.

11. The vehicle according to claim 1, wherein the vehicle is an electric skateboard.

12. A vehicle comprising:
    a load receiver including a first main surface arranged to receive a load from a rider;
    a load detector arranged to detect the load received by the load receiver;
    a wheel provided on a side of a second main surface of the load receiver and driven in accordance with the load detected by the load detector;
    a wheel support provided between the load receiver and the wheel and arranged to rotatably support the wheel;
    a first frame provided between the wheel support and the load receiver and connected with the wheel support;
    a second frame provided between the first frame and the load receiver and fixed to the load receiver; and
    a regulating member arranged to regulate a position of the second frame, enabling the second frame to move in load detecting directions with respect to the first frame; wherein
    the load detector is sandwiched between the first frame and the second frame.

13. The vehicle according to claim 12, wherein the second frame pivots with respect to the first frame in directions included in a plane which is substantially perpendicular to the first main surface of the load receiver and includes longitudinal directions of the load receiver.

14. The vehicle according to claim 12, further comprising an urging member arranged to urge the first frame toward the load receiver.

15. The vehicle according to claim 12, wherein the load detector includes at least one of a strain gauge load cell, an electric capacitance sensor and a potentiometer including a gear.

16. The vehicle according to claim 12, wherein the load detector includes an elastic member and a position sensor arranged to detect displacement of the elastic member caused by the load.

17. The vehicle according to claim 12, further comprising a drive controller operatively connected to the wheel to drive the wheel.

18. The vehicle according to claim 12, wherein the load receiver is a board and the wheel support includes an arm.

19. The vehicle according to claim 18, wherein the arm includes at least one groove arranged to contain the wheel in a variable position so as to change a turning characteristic of the vehicle.

20. The vehicle according to claim 12, wherein the vehicle is an electric skateboard.

* * * * *